US009987576B2

(12) United States Patent
Landers et al.

(10) Patent No.: US 9,987,576 B2
(45) Date of Patent: Jun. 5, 2018

(54) FREQUENCY-BASED FILTERING OF MECHANICAL ACTUATION USING FLUIDIC DEVICE

(71) Applicants: University of Virginia Patent Foundation, Charlottesville, VA (US); The Regents of the University of California, Oakland, CA (US)

(72) Inventors: James P. Landers, Charlottesville, VA (US); Matthew R. Begley, Goleta, CA (US)

(73) Assignees: University of Virginia Patent Foundation, Charlottesville, VA (US); The Regents of the University of California, Oakland, CA (US)

( * ) Notice: Subject to any disclaimer, the term of this patent is extended or adjusted under 35 U.S.C. 154(b) by 0 days. days.

(21) Appl. No.: 14/650,743

(22) PCT Filed: Dec. 10, 2013

(86) PCT No.: PCT/US2013/074152
§ 371 (c)(1),
(2) Date: Jun. 9, 2015

(87) PCT Pub. No.: WO2014/093360
PCT Pub. Date: Jun. 19, 2014

(65) Prior Publication Data
US 2015/0314223 A1    Nov. 5, 2015

Related U.S. Application Data

(60) Provisional application No. 61/735,283, filed on Dec. 10, 2012, provisional application No. 61/735,792, filed on Dec. 11, 2012.

(51) Int. Cl.
*B01D 35/157*    (2006.01)
*F16K 99/00*    (2006.01)
(Continued)

(52) U.S. Cl.
CPC .... *B01D 35/1573* (2013.01); *B01L 3/502715* (2013.01); *B01L 3/502738* (2013.01);
(Continued)

(58) Field of Classification Search
None
See application file for complete search history.

(56) References Cited

U.S. PATENT DOCUMENTS 3,582,037 A    6/1971    Levesque
4,188,977 A    2/1980    Laakaniemi et al.
(Continued)

FOREIGN PATENT DOCUMENTS

AU    2006283177 B2    5/2012
WO    WO-0241994 A2    5/2002
(Continued)

OTHER PUBLICATIONS

"International Application Serial No. PCT/US2013/074152, International Preliminary Report on Patentability dated Jun. 25, 2015", 9 pgs.
(Continued)

*Primary Examiner* — Krishnan S Menon
(74) *Attorney, Agent, or Firm* — Schwegman Lundberg & Woessner, P.A.

(57) ABSTRACT

A mechanical input to a fluidic filter network can be actuated. The fluidic filter network can include respective branches fluidically coupling the mechanical input to respective deformable mechanical outputs. A mechanical displacement can be selectively coupled a selected deformable mechanical output of the fluidic filter network to a deformable mechanical input of a microfluidic device. A fluid flow in a portion of the microfluidic device can be controlled using the displacement, the selected deformable mechanical output can be selected at least in part by actuating the mechanical input to produce a displacement having energy in a specified range of frequencies, and the fluidic filter network is generally fluidically isolated from the microfluidic device.

18 Claims, 11 Drawing Sheets

(51) Int. Cl.
  *B01L 3/00*       (2006.01)
  *G05D 7/06*       (2006.01)
(52) U.S. Cl.
  CPC ...... *F16K 99/0021* (2013.01); *F16K 99/0028* (2013.01); *F16K 99/0034* (2013.01); *G05D 7/0676* (2013.01); *B01L 2300/0816* (2013.01); *B01L 2400/0655* (2013.01); *F16K 2099/0084* (2013.01)

(56) References Cited

U.S. PATENT DOCUMENTS

| | | | |
|---|---|---|---|
| 5,958,349 | A | 9/1999 | Petersen et al. |
| 6,312,929 | B1 | 11/2001 | McMillan |
| 6,368,871 | B1 | 4/2002 | Christel et al. |
| 6,369,893 | B1 | 4/2002 | Christel et al. |
| 6,374,684 | B1 | 4/2002 | Dority |
| 6,403,037 | B1 | 6/2002 | Chang et al. |
| 6,406,605 | B1 | 6/2002 | Moles |
| 6,431,476 | B1 | 8/2002 | Taylor et al. |
| 6,440,725 | B1 | 8/2002 | Pourahmadi et al. |
| 6,534,645 | B2 | 3/2003 | McMillian |
| 6,565,815 | B1 | 5/2003 | Chang et al. |
| 6,619,311 | B2 | 9/2003 | O'Connor et al. |
| 6,660,228 | B1 | 12/2003 | Chang et al. |
| 6,664,104 | B2 | 12/2003 | Pourahmadi et al. |
| 6,713,297 | B2 | 3/2004 | McMillan et al. |
| 6,739,531 | B2 | 5/2004 | Taylor |
| 6,783,736 | B1 | 8/2004 | Taylor et al. |
| 6,783,934 | B1 | 8/2004 | McMillan et al. |
| 6,818,185 | B1 | 11/2004 | Petersen et al. |
| 6,819,027 | B2 | 11/2004 | Saraf |
| 6,878,540 | B2 | 4/2005 | Pourahmadi et al. |
| 6,881,541 | B2 | 4/2005 | Petersen et al. |
| 6,887,693 | B2 | 5/2005 | Mcmillan |
| 6,893,879 | B2 | 5/2005 | Petersen et al. |
| 6,911,327 | B2 | 6/2005 | Mcmillan et al. |
| 6,940,598 | B2 | 9/2005 | Christel et al. |
| 6,942,971 | B2 | 9/2005 | McMillan et al. |
| 6,979,424 | B2 | 12/2005 | Northrup et al. |
| 6,987,018 | B2 | 1/2006 | Taylor et al. |
| 7,101,509 | B2 | 9/2006 | Chang et al. |
| 7,135,144 | B2 | 11/2006 | Christel et al. |
| 7,188,001 | B2 | 3/2007 | Young et al. |
| 7,226,732 | B2 | 6/2007 | Sakai et al. |
| 7,255,833 | B2 | 8/2007 | Chang et al. |
| 7,294,466 | B2 | 11/2007 | McMillan |
| 7,410,760 | B2 | 8/2008 | Swenson |
| 7,445,926 | B2 | 11/2008 | Mathies et al. |
| 7,462,323 | B1 | 12/2008 | Chang et al. |
| 7,569,346 | B2 | 8/2009 | Petersen |
| 7,575,721 | B2 | 8/2009 | Chang et al. |
| 7,621,418 | B2 | 11/2009 | Chang |
| 7,687,232 | B2 | 3/2010 | Gyllensten et al. |
| 7,803,549 | B2 | 9/2010 | Swenson |
| 7,914,994 | B2 | 3/2011 | Petersen et al. |
| 7,998,437 | B2 | 8/2011 | Berndt et al. |
| 8,220,493 | B2 | 7/2012 | Easley et al. |
| 9,050,596 | B2 | 6/2015 | Easley et al. |
| 2001/0012612 | A1 | 8/2001 | Petersen et al. |
| 2001/0019114 | A1 | 9/2001 | Arakawa et al. |
| 2002/0019060 | A1 | 2/2002 | Petersen et al. |
| 2002/0025576 | A1 | 2/2002 | Northrup et al. |
| 2002/0029814 | A1 | 3/2002 | Unger et al. |
| 2002/0031768 | A1 | 3/2002 | McMillan et al. |
| 2002/0034745 | A1 | 3/2002 | McMillan et al. |
| 2002/0034746 | A1 | 3/2002 | McMillan et al. |
| 2002/0039783 | A1 | 4/2002 | McMillan et al. |
| 2002/0042125 | A1 | 4/2002 | Petersen et al. |
| 2002/0045246 | A1 | 4/2002 | McMillan et al. |
| 2002/0055167 | A1 | 5/2002 | Pourahmadi et al. |
| 2002/0058282 | A1 | 5/2002 | McMillan et al. |
| 2002/0109844 | A1 | 8/2002 | Christel et al. |
| 2002/0150683 | A1 | 10/2002 | Troian et al. |
| 2002/0155010 | A1 | 10/2002 | Karp et al. |
| 2002/0166585 | A1 | 11/2002 | O'Connor et al. |
| 2002/0168299 | A1 | 11/2002 | Chang et al. |
| 2002/0175079 | A1 | 11/2002 | Christel et al. |
| 2002/0187074 | A1 | 12/2002 | O'Connor et al. |
| 2002/0187547 | A1 | 12/2002 | Taylor et al. |
| 2003/0066915 | A1 | 4/2003 | Taylor |
| 2003/0152492 | A1 | 8/2003 | Chang et al. |
| 2003/0162304 | A1 | 8/2003 | Dority et al. |
| 2003/0164658 | A1 | 9/2003 | Saraf |
| 2003/0221771 | A1 | 12/2003 | Chang et al. |
| 2004/0075073 | A1 | 4/2004 | Claydon et al. |
| 2004/0096819 | A1 | 5/2004 | McMillan |
| 2004/0101859 | A1 | 5/2004 | Moon |
| 2004/0122559 | A1 | 6/2004 | Young et al. |
| 2004/0166031 | A1 | 8/2004 | Taylor et al. |
| 2004/0200909 | A1 | 10/2004 | McMillan et al. |
| 2005/0003374 | A1 | 1/2005 | Swenson |
| 2005/0042137 | A1 | 2/2005 | Petersen et al. |
| 2005/0069898 | A1 | 3/2005 | Moon et al. |
| 2005/0095603 | A1 | 5/2005 | Mokkapati et al. |
| 2005/0194316 | A1 | 9/2005 | Pourahmadi et al. |
| 2005/0244837 | A1 | 11/2005 | McMillan et al. |
| 2005/0255516 | A1 | 11/2005 | McMillan et al. |
| 2006/0014200 | A1 | 1/2006 | McMillan |
| 2006/0019379 | A1 | 1/2006 | Taylor et al. |
| 2006/0027686 | A1 | 2/2006 | Taylor et al. |
| 2006/0068398 | A1 | 3/2006 | McMillan |
| 2006/0068399 | A1 | 3/2006 | McMillan et al. |
| 2006/0169708 | A1 | 8/2006 | Chang |
| 2006/0177844 | A1 | 8/2006 | Ching et al. |
| 2006/0229441 | A1 | 10/2006 | Gall |
| 2006/0275178 | A1 | 12/2006 | Chang et al. |
| 2007/0259362 | A1 | 11/2007 | Sakai et al. |
| 2008/0014114 | A1 | 1/2008 | Van Atta et al. |
| 2008/0038737 | A1 | 2/2008 | Smith et al. |
| 2008/0057572 | A1 | 3/2008 | Petersen et al. |
| 2008/0193946 | A1 | 8/2008 | Mcmillan |
| 2008/0227090 | A1 | 9/2008 | Sakai et al. |
| 2008/0254532 | A1 | 10/2008 | Chang et al. |
| 2008/0286151 | A1 | 11/2008 | Chang et al. |
| 2008/0286798 | A1 | 11/2008 | Swenson |
| 2009/0047669 | A1 | 2/2009 | Zhang et al. |
| 2009/0062135 | A1 | 3/2009 | Delfour et al. |
| 2009/0165876 | A1 | 7/2009 | Atkin et al. |
| 2009/0217993 | A1 | 9/2009 | Easley et al. |
| 2009/0308886 | A1 | 12/2009 | Chang et al. |
| 2010/0068706 | A1 | 3/2010 | Pourahmadi et al. |
| 2010/0129827 | A1 | 5/2010 | Mcmillan |
| 2010/0136569 | A1 | 6/2010 | Moon et al. |
| 2010/0233704 | A1 | 9/2010 | Michot et al. |
| 2010/0240049 | A1 | 9/2010 | Svanholm Barrie et al. |
| 2011/0039303 | A1 | 2/2011 | Jovanovich et al. |
| 2011/0053155 | A1 | 3/2011 | Gall |
| 2011/0301535 | A1 | 12/2011 | Takayama et al. |
| 2012/0128549 | A1 | 5/2012 | Zhou et al. |
| 2012/0222747 | A1 | 9/2012 | Easley et al. |

FOREIGN PATENT DOCUMENTS

| | | |
|---|---|---|
| WO | WO-2004/061085 A2 | 7/2004 |
| WO | WO-2004061085 A2 | 7/2004 |
| WO | WO-2007024829 A2 | 3/2007 |
| WO | WO-2007024829 A3 | 3/2007 |
| WO | WO-2008062350 A2 | 5/2008 |
| WO | WO-2014093360 A1 | 6/2014 |

OTHER PUBLICATIONS

"U.S. Appl. No. 12/064,557, Response filed Feb. 23, 2012 to Non Final Office Action dated Aug. 30, 2011", 12 pgs.
"U.S. Appl. No. 12/064,557, Non Final Office Action dated Aug. 30, 2011", 12 pgs.
"U.S. Appl. No. 12/064,557, Notice of Allowance dated Mar. 22, 2012", 8 pgs.
"U.S. Appl. No. 12/064,557, Response file d7-14-11 to Restriction Requirement dated Jun. 15, 2011", 7 pgs.
"U.S. Appl. No. 12/064,557, Restriction Requirement dated Jun. 15, 2011", 5 pgs.

(56) References Cited

OTHER PUBLICATIONS

"U.S. Appl. No. 13/474,420, Corrected Notice of Allowance dated Apr. 15, 2015", 4 pgs.
"U.S. Appl. No. 13/474,420, Non Final Office Action dated Mar. 27, 2014", 8 pgs.
"U.S. Appl. No. 13/474,420, Notice of Allowance dated Feb. 4, 2015", 9 pgs.
"U.S. Appl. No. 13/474,420, Response filed Mar. 6, 2014 to Restriction Requirement dated Dec. 6, 2013", 6 pgs.
"U.S. Appl. No. 13/474,420, Response filed Sep. 26, 2014 to Non Final Office Action dated Mar. 27, 2014", 10 pgs.
"U.S. Appl. No. 13/474,420, Restriction Requirement dated Dec. 6, 2013", 5 pgs.
"Australian Application Serial No. 2006283177, First Examiner Report dated Mar. 15, 2010", 2 pgs.
"Australian Application Serial No. 2006283177, Office Action Response Filed Apr. 15, 2011", 6 pgs.
"Australian Application Serial No. 2006283177, Response filed Oct. 14, 2011 to Office Action dated May 13, 2011", 5 pgs.
"Australian Application Serial No. 2006283177, Subsequent Examiner Report dated May 13, 2011", 2 pgs.
"Australian Application Serial No. 2012200887, First Examiner Report dated May 15, 2013", 3 pgs.
"Australian Application Serial No. 2012200887, Office Action dated Sep. 25, 2014", 3 pgs.
"Australian Application Serial No. 2012200887, Response filed Sep. 3, 2014 to Office Action dated May 15, 2013", 17 pgs.
"Canadian Application Serial No. 2,620,285, Office Action dated Aug. 18, 2014", 2 pgs.
"Canadian Application Serial No. 2,620,285, Office Action dated Aug. 27, 2013", 2 pgs.
"Canadian Application Serial No. 2,620,285, Response filed Feb. 14, 2014 to Office Action dated Aug. 27, 2013", 10 pgs.
"European Application Serial No. 06802046.0, Examination Notification Art. 94(3) dated Nov. 20, 2014", 4 pgs.
"European Application Serial No. 06802046.0, Extended European Search Report dated Aug. 13, 2010", 8 Pgs.
"European Application Serial No. 06802046.0, Office Action dated Apr. 15, 2011", 4 pgs.
"European Application Serial No. 06802046.0, Office Action dated Nov. 7, 2012", 4 pgs.
"European Application Serial No. 06802046.0, Response filed Mar. 28, 2011 to EP Search Report dated Aug. 13, 2010", 9 pgs.
"European Application Serial No. 06802046.0, Response filed Aug. 9, 2011 to Non Final Office Action dated Apr. 15, 2011", 5 pgs.
"International Application Serial No. PCT/US2006/032717, International Preliminary Examination Report dated Mar. 10, 2009", 7 pgs.
"International Application Serial No. PCT/US2006/032717, Written Opinion dated Jul. 31, 2008", 6 pgs.
"International Application Serial No. PCT/US2013/074152, International Search Report dated Mar. 27, 2014", 2 pgs.
"International Application Serial No. PCT/US2013/074152, Written Opinion dated Mar. 27, 2014", 7 pgs.
Begley, Matthew R., et al., "Periodic Response of Fluidic Networks with Passive Deformable Features", Applied Physics Letters 95, 203501 2009, (Nov. 16, 2009), 4 pgs.
Collino, Rachel R, et al., "Flow switching in microfluidic networks using passive features and frequency tuning", Lab Chip, (2013), 3668-3674.
Hasselbrink, Ernest F, et al., "High-Pressure Microfluidic Control in Lab-on-a-Chip Devices Using Mobile Polymer Monoliths", Lab Chip, Anal. Chem. 2002, 74, 4913-4918 Sandia National Laboratories, P.O. Box 969, Livermore, California 94551, (2002), 4913-4918.
Utz, Marcel, et al., "Microfluidic Waves", Lab Chip, (Nov. 21, 2011), 3846-3854.
Xie, Yan, "Chemical Signal Analysis with Fourier Microfluidics", (Aug. 2008), 220 pgs.

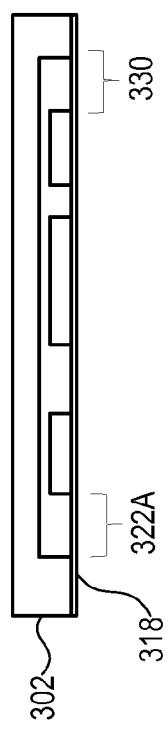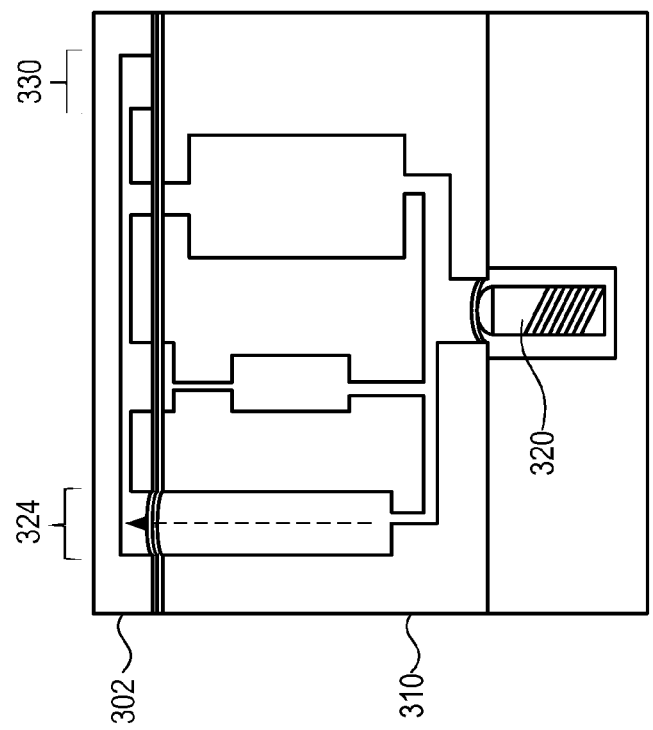

FREQUENCY-BASED FILTERING OF MECHANICAL ACTUATION USING FLUIDIC DEVICE

CLAIM OF PRIORITY

This patent application is a U.S. National Stage Filing under 35 U.S.C. 371 from International Patent Application Serial No. PCT/US2013/074152, filed on Dec. 10, 2013 and published as WO 2014/093360 on Jun. 19, 2014, which claims the benefit of priority of (1) Landers et al., U.S. Provisional Patent Application Ser. No. 61/735,283, titled "Device and Method for Frequency-based Filtering of Mechanical Actuation Based on Fluid Filled Networks with Embedded Deformable Features," filed on Dec. 10, 2012 and (2) Landers et al., U.S. Provisional Patent Application Ser. No. 61/735,792, titled "Device and Method for Frequency-based Filtering of Mechanical Actuation Based on Fluid Filled Networks with Embedded Deformable Features," filed on Dec. 11, 2012, each of which is hereby incorporated by reference herein in its entirety.

BACKGROUND

Fluidic devices, such as including a network of fluid-filled or fluid-carrying regions, can be used for a variety of applications, such as for chemical analysis or assay. Such devices can be fabricated to support analysis using analyte or reagent volumes on the order of microliters, nanoliters, picoliters, or smaller volumes, for example. Such miniaturized devices carrying such minute volumes can be referred to as "microfluidic" devices. Microfluidic devices can be fabricated using lithographic techniques, such as to form integrated fluidic networks or analysis systems, in a manner similar to integrated circuit fabrication.

In one approach, such devices can include valve structures comprising microelectromechanical (MEMS) structures, such as to control flow along a branch or channel of a fluidic device. However, as the complexity of analysis or assay increases, increasing numbers of valves and related control devices can inordinately increase cost and size, decrease reliability, or thwart objectives such as disposability or rapid replacement. Thus, controlling flow in such fluidic devices exclusively using "active" valve structures such as MEMS structures can be prohibitively expensive or can limit an overall complexity of a fluidic device. Such limitations can become significant where the fluidic device is to be used in a point-of-care diagnostic or other application where portability, low cost, or disposability is desired.

In some approaches, flow in a fluidic device can be controlled using one or more passive fluidic networks included as a portion of the fluidic device. Easley et al., International Patent Application Publication Number WO 2007/024829 A2, titled "Passive Components for Micro-Fluidic Flow Profile Shaping and Related Method Thereof" mentions (at page 6) "passive flow control components . . . presented as analogs to circuit components in the electronic arts, and thus can be combined in a similar manner. The passive flow components of the present invention include fluidic diodes, fluidic capacitors, and fluidic inductors." Easley et al. is hereby incorporated herein by reference in its entirety, including Easley et al.'s description of passive flow control components for use in a fluidic device, such as a microfluidic device.

OVERVIEW

In an example, characteristic frequencies of branches in a fluid-filled or "fluidic" network can arise from coupling between fluid in branches (e.g., channels) of the network and passive deformable features. Such characteristic frequencies can be established such as by adjusting the dimensions or stiffness of the deformable features. In contrast to quasi-static "on-off" valves, such fluidic networks can include as little as a single actively-driven element, such as using relatively small dynamic displacements to enhance or suppress flow. In an example, to achieve flow switching between different pathways in the network, branches can be established having well-separated peak characteristic pressure oscillation frequencies and narrow bandwidths (e.g., such that the branches are independently addressable using a oscillatory input displacement to generate a time-varying pressure at one or more solid-fluid boundaries established by the fluidic network).

Generally, fluidic networks can be configured to shuttle analyte, reagent, or intermediate compounds to various locations on or within the fluidic device. The fluidic device can be coupled to or can include inputs ports, channels, reservoirs, reaction chambers, output ports, or other structures. In this manner, a chemical analysis or assay can be performed rapidly and at small scale automatically or semi-automatically, such as with minimal intervention by a user. A geometry, a shape, or a material used for a passive fluidic network can provide frequency-selective or flow-direction-selective (e.g., diode or check-valve-like) characteristics. In some approaches, the passive fluidic networks carry an analyte, a reagent, or intermediate compounds and are also providing the mechanical characteristics that establish the flow control behavior. Accordingly, this can limit options with respect to flow control characteristics, preclude re-use, or can cause such characteristics to shift as the fluidic device is used because such a fluidic network in such approaches is being used as both a flow control network and also as a carrier for the analyte, reagent, or intermediate compounds. Characteristics, such as flow volumes or dimensions suitable for analysis or assays can be incompatible with the fluidic network dimensions, configuration, or other constraints used to establish a particular mechanical characteristic response.

By contrast, the present inventors have recognized that a frequency-selective mechanical filter can be provided, such as including a closed fluidic network mechanically coupled to a microfluidic device, such as to provide flow-control while being fluidically isolated from the microfluidic device containing analyte, reagent, or intermediate compounds. In an example, the microfluidic device can include a "chip" assembly that is removable or disposable, such as coupleable to the frequency-selective mechanical fluidic filter network.

In an example, a mechanical input to a fluidic filter network can be actuated. The fluidic filter network can include respective branches fluidically coupling the mechanical input to respective deformable mechanical outputs. A mechanical displacement can be selectively coupled a selected deformable mechanical output of the fluidic filter network to a deformable mechanical input of a microfluidic device. A fluid flow in a portion of the microfluidic device can be controlled using the displacement, the selected deformable mechanical output can be selected at least in part by actuating the mechanical input to produce a displacement having energy in a specified range of frequencies, and the fluidic filter network is generally fluidically isolated from the microfluidic device.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 3A illustrates generally an example of a microfluidic device that is coupleable to the frequency-selective mechanical filter network.

FIG. 3B illustrates generally an example of a frequency-selective mechanical filter network that is coupleable to the microfluidic device of FIG. 3A.

FIG. 3C illustrates generally an example of a system that can include the frequency-selective mechanical filter network of FIG. 3B coupled to the microfluidic device of FIG. 3A.

Figure 1:
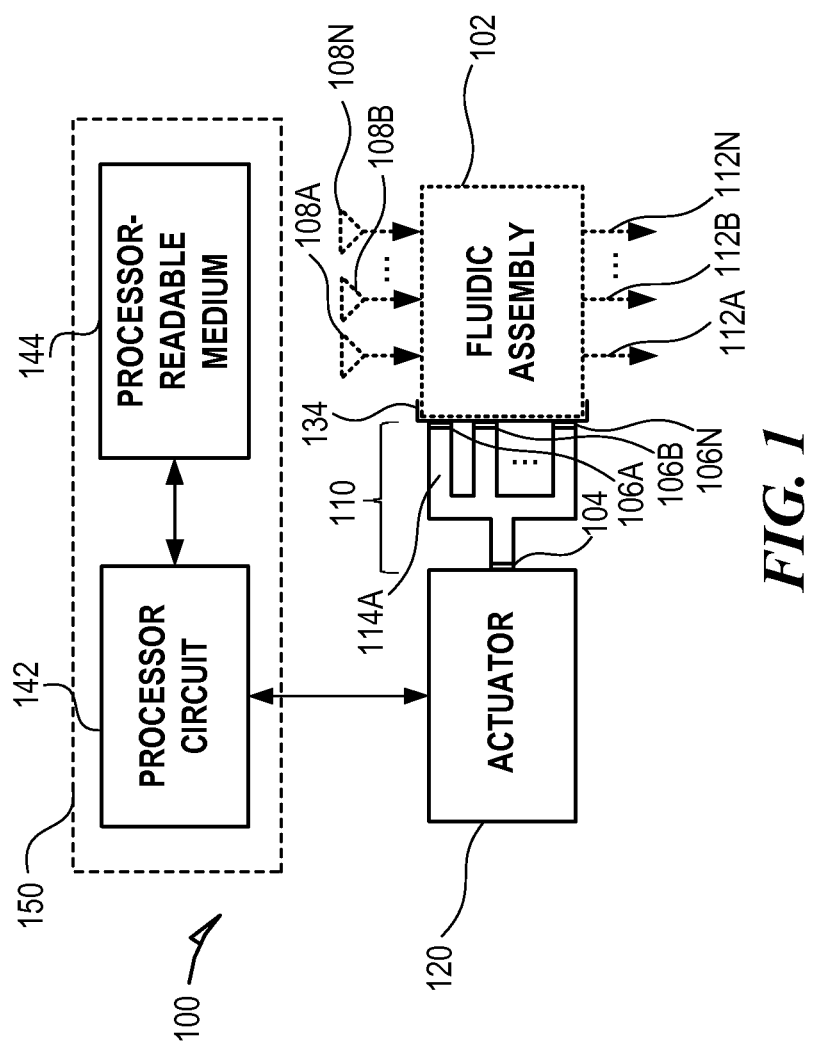
FIG. 1 illustrates generally an example of a system that can include an actuator mechanically coupled to frequency-selective mechanical filter network.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally an example of a system 100 that can include an actuator 120 mechanically coupled to a frequency-selective mechanical filter network (e.g., a fluidic filter network 110). The actuator 120 can be an electrical-to-mechanical actuator, such as a voice-coil actuator, coupled to a processor circuit 142, such as through one or more of a power amplifier or digital-to-analog converter. The processor circuit 142 can be coupled to a processor-readable medium 144, such as to control the actuator 120 according a sequence or programmed series of operations (e.g., instructions) stored using the processor-readable medium 144. The processor circuit 142 and processor-readable medium 144 can be included as a portion of a controller 150, such as coupled to the actuator or other portions of the system 100 using a wireless or wired coupling. For example, the controller 150, actuator 120, and fluidic filter network 110 can be included within a commonly-shared housing or assembly.

The fluidic filter network 110 can include one or more mechanical inputs, such as a mechanical input 104 comprising a compliant or flexible material. The fluidic filter network 110 can be closed (e.g., fluidically isolated from one or more of a nearby fluidic assembly 102 or the surroundings), such as including one or more fluid-filled branches (e.g., channels, tubes, or other structures) such as a first branch 114A. Such branches of the fluidic filter network 110 can fluidically couple a displacement from the mechanical input 104 to one or more deformable mechanical outputs, such as a first deformable mechanical output 106A, a second mechanical output 106B, or an "Nth" mechanical deformable output 106N. Such branches can be formed using a material that is relatively more rigid than a material used for the mechanical outputs 106A through 106N or the mechanical input 104. For example, one or more of the mechanical input 104 or mechanical outputs 106A through 106N can include a membrane.

The fluidic assembly 102 can include a microfluidic "chip" device as shown and described elsewhere herein. The fluidic assembly 102 can include or can be coupled to one or more fluid reservoirs or fluid inputs such as a first reservoir 108A, a second reservoir 108B, or an "Nth" reservoir 108N (e.g., the assembly 102 need not be limited to one, two, or three reservoirs and can have many reservoirs). Similarly, the fluidic assembly 102 can include one or more fluid outputs (e.g., channel outlets) such as a first fluid output 112A, a second fluid output 112B, or an "Nth" fluid output 112N. The fluidic assembly 102 can include respective deformable mechanical inputs that can be coupled to corresponding mechanical outputs 106A through 106N of the fluidic filter network.

For example, a mechanical displacement can be coupled to a desired mechanical output amongst the outputs 106A through 106N, such as using a single actuator 120. The actuator 120 can provide a mechanical displacement at the mechanical input 104 of the fluidic filter network 110, and the physical arrangement of the fluidic filter network 110 or portions of the fluidic assembly 102 can passively respond to the mechanical displacement and couple the mechanical displacement to one or more selected outputs in an addressable manner depending on the range of frequencies of energy included in the mechanical displacement. Such a mechanical displacement can induce a time-varying pressure in the relatively-incompressible fluid filling the fluidic filter network 110, such as exciting a characteristic resonant or near-resonant frequency of one or more branches. Accordingly, the word "filter" in the context of the fluidic filter network 110 can refer to the mechanical response of the fluidic filter network 110 behaving as a mechanical analog filter analogous to a passive electrical network.

Displacements coupled to the fluidic assembly 102 can be used to control (e.g., enhance or suppress) flow within regions of the fluidic assembly 102. For example, a fluidic diode can be included as a portion of the fluidic assembly 102, and a symmetric positive and negative time-varying mechanical displacement coupled to the fluidic assembly can be rectified to create a fluid flow in a desired direction. In this manner, the fluidic assembly can be used to perform chemical analysis or assay according to a desired sequence of steps. The fluidic assembly 102 may be removable or disposable, such as coupled to the fluidic filter network 110 when the fluidic assembly is placed on or within a mechanical receptacle 134.

Figure 2:
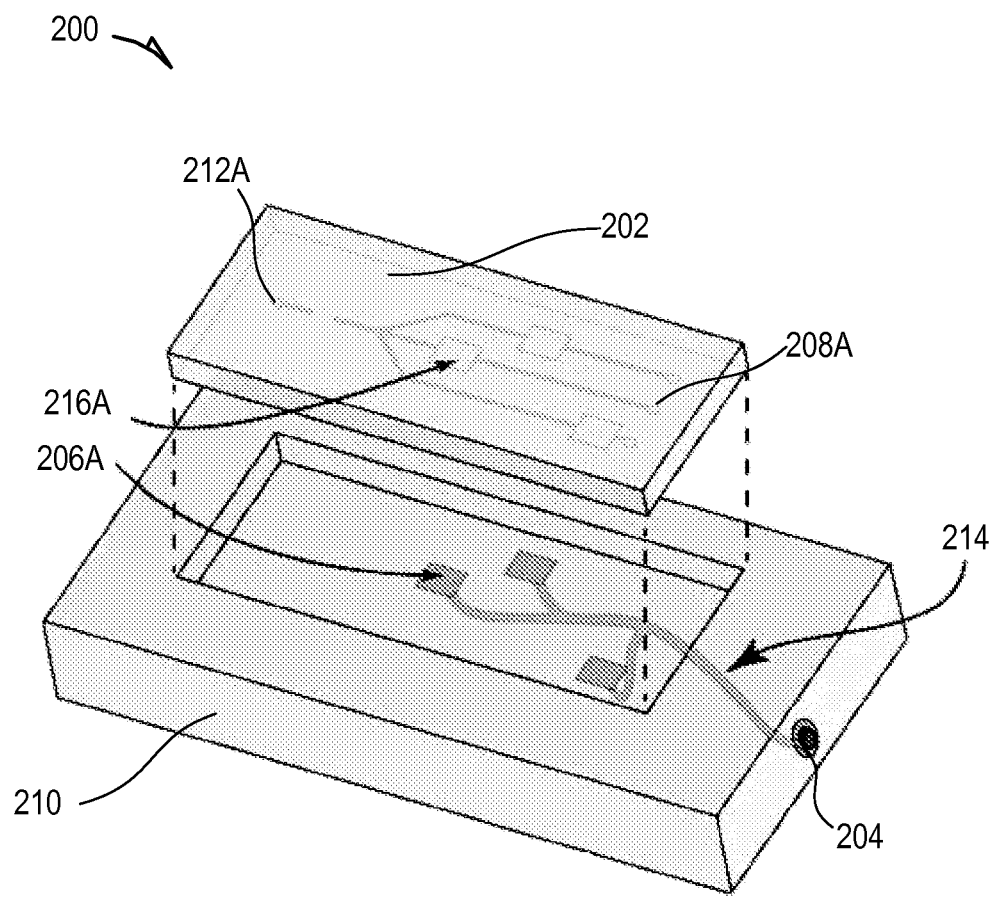
FIG. 2 illustrates generally an example of a system that can include a frequency-selective mechanical filter network and a microfluidic device that is coupleable to the frequency-selective mechanical filter network.

FIG. 2 illustrates generally an example of a system 200 that can include a frequency-selective mechanical filter network (e.g., a fluidic filter network 210) and a microfluidic device 202 that is coupleable to the fluidic filter network 210. The fluidic filter network 210 can be used to direct flow within a separate fluidic network embedded in a chip structure (e.g., the microfluidic device 202). The microfluidic device 202 can be pressed or inserted into contact with the fluidic filter network 210, such as using a cavity or other mechanical receptacle. As mention in FIG. 1, the fluidic filter network 210 can be coupled to the processor circuit, such as to provide a reconfigurable control system with pressure pulses transmitted from the control layer (e.g., the fluidic filter network 210) to the chip (e.g., microfluidic device 202) through deformable films (e.g., a mechanical output 206A coupled to a corresponding mechanical input 216A). In this manner, flow can be controlled, such as to controllably cause fluid from a fluid input 208A to flow toward a fluid output 212A, such as through or using a fluidic diode structure.

While the configuration in FIG. 2A may bear superficial similarity to a pneumatic valve layer, FIG. 2A differs because elements in both the microfluidic device 202 and the fluidic filter network 210 are passive, and are driven by a single active element (e.g., an actuator 204 using a input branch 214). Differential flow between branches in the microfluidic device 202 can be achieved by tuning the actuation frequency to match characteristic frequencies of fluidic branches in the fluidic filter network 210. Generally, the fluidic filter network 210 acts as a mechanical filter that can deliver displacement (e.g., pressure) to different points on the microfluidic device 202 when different branches are activated via frequency tuning. The present inventors have recognized, among other things, that such passive filtering behavior eliminates the need for active valves or switching solenoids to activate different pathways as used in other contrasting approaches to flow control.

Also, a frequency response of the fluidic filter network 210 can be adjusted without altering the channel configuration of the microfluidic device 202 itself. In this manner, the chemical and mechanical function of the microfluidic device 202 can be established largely independently of the configuration of the fluidic filter network 210. The actuator 204 and fluidic filter network 210 may be more complex to fabricate than the microfluidic device 202, but the microfluidic device 202 can be removable, so the fluidic filter network 210 can be re-used with another microfluidic device 202 (or used with various different microfluidic devices to perform different assays or analyses, such as according to stored instructions as mentioned above in the example of FIG. 1 including a processor circuit and processor-readable medium).

The fluidic filter network 210 can be configured to provide various zonal filter responses, such as a low-pass configuration (e.g., enhancing coupling of displacement to an output when excitation frequency provided to the actuator is below a specified cutoff frequency), a high-pass configuration (e.g., enhancing coupling of displacement to an output when excitation frequency provided to the actuator is above a specified cutoff frequency), or band-pass configuration (e.g., enhancing coupling of displacement to an output when excitation frequency provided to the actuator is within a specified range of frequencies). For example, fluidic inertia can be used to provide band-pass behavior in which displacements are coupled to mechanical outputs of the fluidic filter network 210 only in a narrow range of frequencies. Narrow bandwidths can be used to provide precise and selective flow switching, such as to select between two fluid channels to be controlled in a microfluidic device 202.

FIG. 3A illustrates generally a side view of an example of a microfluidic device that is coupleable to the frequency-selective mechanical filter network, such as shown in examples of FIG. 3B or 3C. The microfluidic device can include a rigid layer 302, such as including silicon, glass, a ceramic, a polymer material, a metal, quartz, or another material, such as selected for compatibility of etching fabrication processing or for compatibility with reagent or analyte that will be flowing through one or more channels formed in the rigid layer 302. A deformable or "compliant" layer 318 can be mechanically coupled to the rigid layer 318, such as to enclose interior channels of the microfluidic device. The compliant layer 318 can be formed from one or more materials such as polydimethylsiloxane (PDMS), polymethylmethacrylate (PMMA), polyisoprene, polybutadiene, polychloroprene, polyisobutylene, polystyrene-butadiene-styrene), a polyurethane, a silicone polymer, poly(bis (fluoroalkoxy) phosphazene) (PNF, e.g., Eypel-F), poly (carborane-siloxane) (e.g., Dexsil), poly(acrylonitrile-butadiene) (nitrile rubber), poly(1-butene), a poly (chlorotrifluoroethylene-vinylidene fluoride) copolymer (e.g., Kel-F), poly(ethyl vinyl ether), poly(vinylidene fluoride), poly(vinylidene fluoride-hexafluoropropylene) copolymer (e.g., Viton), an elastomeric composition of polyvinylchloride (PVC), polysulfone, polycarbonate, polytetrafluoroethylene (e.g., Teflon), or including one or more other materials.

The compliant layer 318 can include a region 322A contiguous with a channel or other portion of the microfluidic device, such as to provide a deformable mechanical input. When actuated by a displacement, the deformable mechanical input can enhance flow in the channel corresponding to the deformable mechanical input. The microfluidic device can include one or more fluid reservoirs, such as a reservoir in the region 330.

FIG. 3B illustrates generally a side view of an example of a frequency-selective mechanical filter network (e.g., a fluidic filter network) that is coupleable to the microfluidic device of FIG. 3A. The fluidic filter network can include a substrate such as formed using materials as mentioned above in relation to the microfluidic device of FIG. 3A. The substrate can include a deformable mechanical input 304 (e.g., a membrane) that can be displaced by an actuator 320 (e.g., a voice-coil actuator). The fluidic filter network can include various branches, such as a first branch 314A, a second branch 314B, or a third branch 314C. The branches 314A through 314C can include lengths that differ from one another, cross sectional areas that differ from one another, or shapes that differ from one another. The branches 314A through 314C can terminate or can be bounded in certain portions by a compliant layer 320. In this manner, deformable mechanical outputs can be formed, such as a first deformable mechanical output 306A in the region nearby the first branch 314A.

FIG. 3C illustrates generally a side view of an example that can include the frequency-selective mechanical filter network of FIG. 3B coupled to the microfluidic device of FIG. 3A. In FIG. 3C, the actuator 320 can provide a displacement having mechanical energy in a specified range of frequencies, such as to selectively address a desired mechanical output. In this manner, a displacement is selectively coupled from a branch within the fluidic filter network substrate 310 to a desired region 324 of a channel in the microfluidic device substrate 302. For example, such a displacement could cause a flow to occur within the microfluidic device, such as towards or using a reservoir 330, such as through or using a fluidic diode included as a portion of the microfluidic device.

Figure 4:
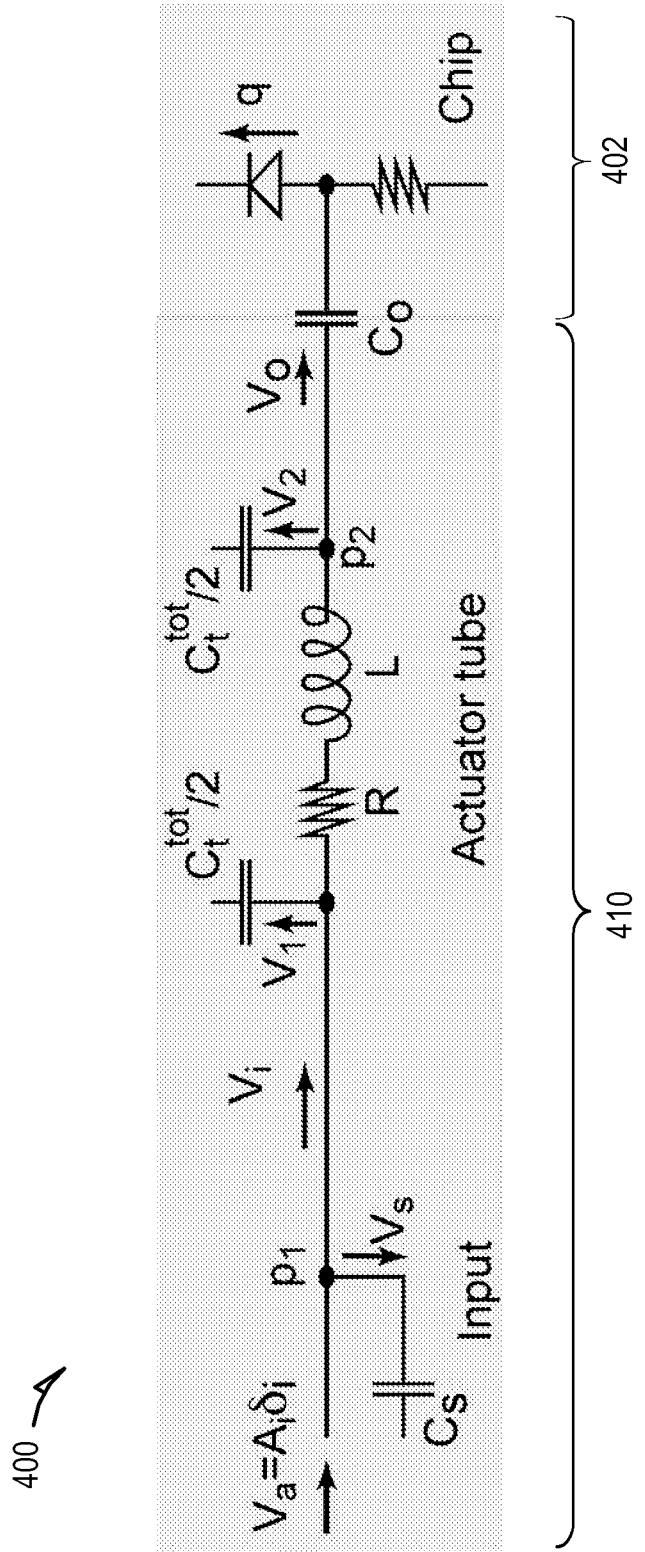
FIG. 4 illustrates generally an illustrative example of an electrical network that can model various aspects of a frequency-selective mechanically filter network coupled to a microfluidic device using electrical components as analogs to mechanical elements.
Figure 5:
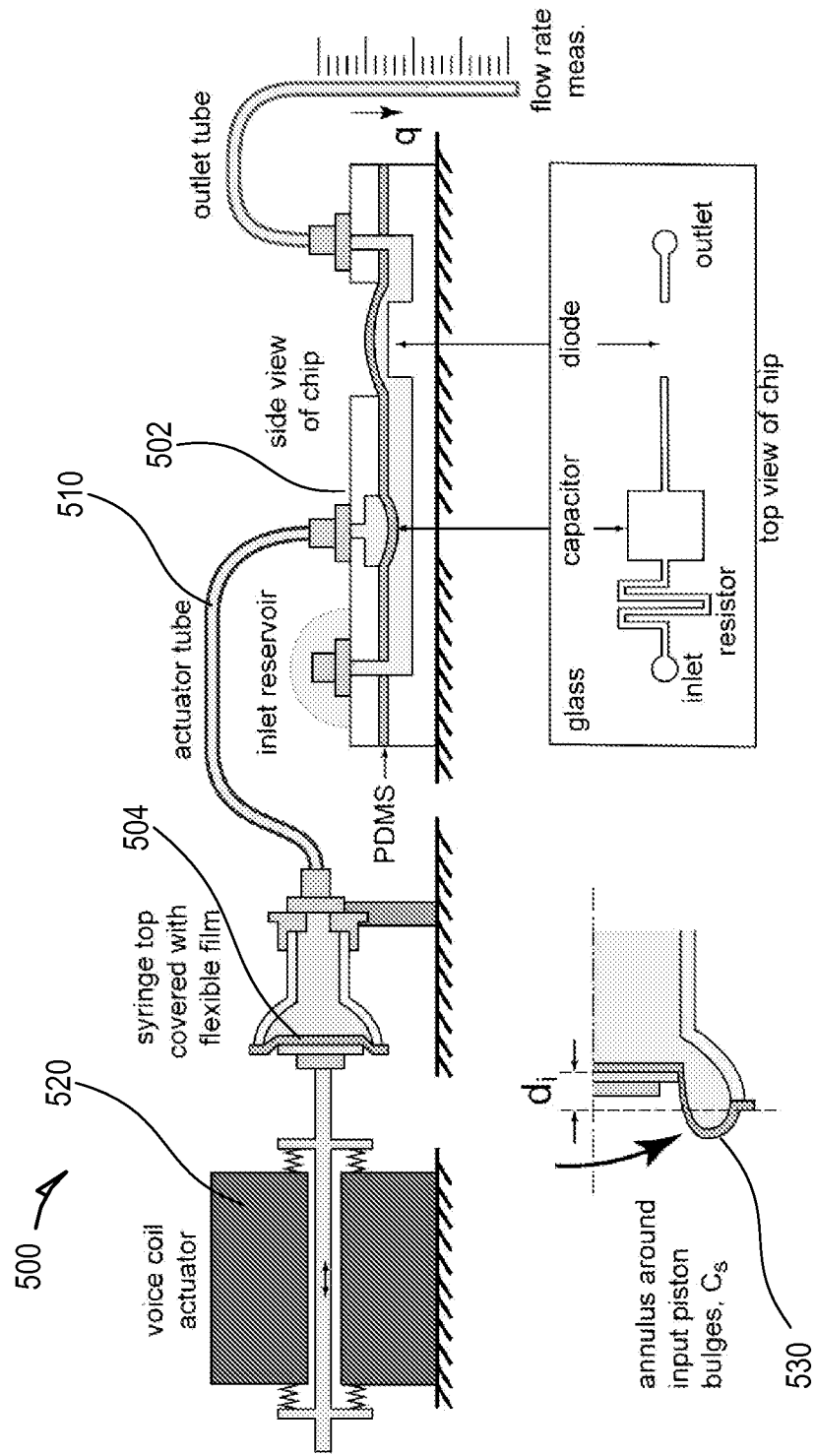
FIG. 5 illustrates generally an illustrative example of a frequency-selective configuration that can be used to evaluate various configurations of mechanical filter networks and coupled microfluidic devices, such as can be used to obtain the results shown in the illustrative examples of FIGS. 6A through 6C.

FIG. 4 illustrates generally an illustrative example of an electrical network 400 that can model various aspects of a frequency-selective mechanical filter network coupled to a microfluidic device using electrical components as analogs to mechanical elements, such as corresponding to the mechanical configuration shown in the apparatus of the example of FIG. 5. Such a model can be used to help predict the frequencies at which flow occurs in various portions of a system (e.g., as shown in FIG. 1, 2 or 5) as a function of the feature properties (e.g., dimensions or material stiffnesses of deformable features). For simplicity, the focus of the model can be on the coupling between the activation network (e.g., provided by an actuator) and the interface between a fluidic filter network (e.g., corresponding to a region 410 of the network 400) and a microfluidic "chip" (e.g., corresponding to a region 402 of the model). The model generally need not include additional features that can be included in a network formed by the chip itself. These omitted features need not impact characteristic frequencies at which flow occurs. Two separate analyses can be performed, including establishing a network model (analogous to circuit analysis in electronic systems) along with mechanics modeling of deformable features, which can be used to determine specific properties or values for use in the network 400 model.

A relationship between characteristic frequencies of the system and the physical properties of the system can be predicted using a linear circuit model of the coupled network, shown in FIG. 4. In an example where the fluidic filter network comprises a flexible actuator tube 510, such as shown in illustrative example of FIG. 5, deformable features of the network (including the tube 510 and a deformable film at the chip/tube interface) can introduce fluidic capacitance by storing and releasing fluid in response to pressure changes. The fluid used in both networks is generally assumed to be incompressible, such that no additional capacitance is introduced due to fluid compressibility. Such an actuator tube 510 as shown in the example of FIG. 5 can also introduce fluidic resistance (e.g., due to viscous loss) and fluidic inductance (e.g., due to inertial forces associated with accelerating flow). A fluidic diode in the chip network can introduce a non-linear pressure-flow relationship (due to solid-fluid coupling), but this effect can be neglected in cases where the characteristic frequencies are dominated by the linear response of the actuator tube and deformable film at the interface between the tube and the chip.

In an example including a voice-coil actuator, derivation of the governing equations relating voice-coil motion and the deflection of the on-chip capacitor (film) can include using force balance (e.g., including pressure drops associated with viscous loss and acceleration) and mass conservation analysis techniques. As an illustrative example, expressions can be cast in terms of two coupled second order differential equations that describe the motion of the actuator, $\delta_a(t)$, and the center-point displacement of the film connecting the actuator tube to the chip (e.g., the chip capacitor), $\delta_o(t)$. A volume of fluid injected by the actuator motion can be represented as $V_a = A_i \delta_a$ (where $A_i$ can represent an area of the input piston), and a volume of fluid in the chip capacitor can be represented as $V_o = \alpha A_o \delta_o$, where $A_o$ can represent an area of the chip capacitor and $\alpha$ can be a dimensionless constant arising from analysis of the shape of the deformed chip capacitor. Using these substitutions, governing equations can be represented by the following system of equations:

$$\begin{bmatrix} m_v & 0 \\ 0 & m_f \end{bmatrix} \begin{Bmatrix} \ddot{\delta}_a \\ \ddot{\delta}_o \end{Bmatrix} + \begin{bmatrix} c_v & 0 \\ 0 & c_t \end{bmatrix} \begin{Bmatrix} \dot{\delta}_a \\ \dot{\delta}_o \end{Bmatrix} + \begin{bmatrix} k_v + k_c & -k_{12} \\ -k_{21} & k_o \end{bmatrix} \begin{Bmatrix} \delta_a \\ \delta_o \end{Bmatrix} = \begin{Bmatrix} F_i(\omega t) \\ 0 \end{Bmatrix} \quad (1)$$

where $m_v$ and $c_v$ can represent the effective mass and effective damping constant for the voice-coil (e.g., due to eddy currents and friction), respectively, and $F_i(\omega t)$ can represent the electromagnetic force applied to the voice coil shaft. The effective mass and effective damping constant of the fluid in the tube can be represented by $m_f = \alpha L A_o^2$, and $c_t = \alpha R A_o^2$. The effective stiffness values can be represented by:

$$k_c = \frac{A_i^2}{C_s + C_t}; k_{12} = \alpha \left( \frac{C_t + C_o}{C_o} \right) \frac{A_i A_o}{C_t + C_s} \quad (2)$$

$$k_{21} = \left( \frac{C_o}{C_o + C_t} \right) \frac{A_i A_o}{C_s + C_t}; k_o = \alpha A_o^2 \left( \frac{1}{C_t + C_o} + \frac{1}{C_s + C_t} \right) \quad (3)$$

A stiffness $k_{12}$ can represent stray capacitance introduced by the input membrane. $C_t$, $C_o$, and $C_s$ can represent the capacitance of the tube, output capacitor, and annulus, respectively. These expressions can be easily solved to yield two characteristic frequencies of the system; one is dominated by the mass and stiffness of the actuator, while the other is dominated by the effective fluid mass and stiffness of the tube and film at the tube/chip interface.

A capacitance of the film at the tube/chip interface can be estimated using an analytical result for a pressurized circular plate, which can be represented by:

$$C_o = \frac{3(1-v^2)\pi a^6}{64 E h^3} \quad (4)$$

where a can be an effective radius of the deformable film, E can represent an elastic modulus, v can represent a Poisson's ratio, and h can represent a film thickness. The relationship between deformed volume and center-point deflection for a circular plate can be represented by $V_o = \pi a^2 \delta_o / 3$, or $V_o = A_o \delta_o / 3$; hence, $\alpha = \frac{1}{3}$.

For the tube, a capacitance can be estimated using a mechanics solution for a pressurized tube (e.g., subject to the constraint of zero axial expansion or "plane strain"). A total capacitance corresponding to the tube can be represented as:

$$C_t^{tot} = \frac{2\pi \ell_t R_i^2 (1+v)(R_i^2(2v-1) - R_o^2)}{E_t(R_i^2 - R_o^2)} \quad (5)$$

where $l_t$ can represent a length of the tube, $E_t$ can represent an elastic modulus of the tube, and $R_i$ and $R_o$ can represent an inner and an outer radius of the tube, respectively. In the above derivation, $C_t$ can be defined as one-half this value, e.g., a capacitance due to the tube can split into equal capacitors near the entrance and outlet. A fluidic resistance and inductance of the tube, assuming fully developed steady flow, can be represented by:

$$R = \frac{8\mu l_t}{\pi R_i^4}; \quad L = \frac{\rho l_t}{\pi R_i^2} \quad (6)$$

A capacitance of the annulus surrounding the input piston (e.g., a bulging region 530 of a syringe film 504 as shown in the example of FIG. 5) can be estimated from plate mechanics, assuming a uniform pressure acting over this region. A 'pinned' boundary condition (e.g., allowing for a film to rotate freely along the rims where it is bonded to a piston and a syringe cap) can provide an estimate for capacitance. An expression for narrow annuli can be found by taking a limit when $\Delta R_i^a = R_o^a - R_i^a$ is small, where $R_i^a$ and $R_o^a$ represent an inner and outer radius of the actuator, respectively. This yields:

$$C_s = \frac{(1-v^2)R_i^a(\Delta R_i^a)^5}{Eh^3} \times \left(\frac{2}{5} + \frac{\pi}{10}\frac{\Delta R_i^a}{R_i^a} + O\left[\left(\frac{\Delta R_i^a}{R_i^a}\right)^2\right]\right) \quad (7)$$

Figure 6A:
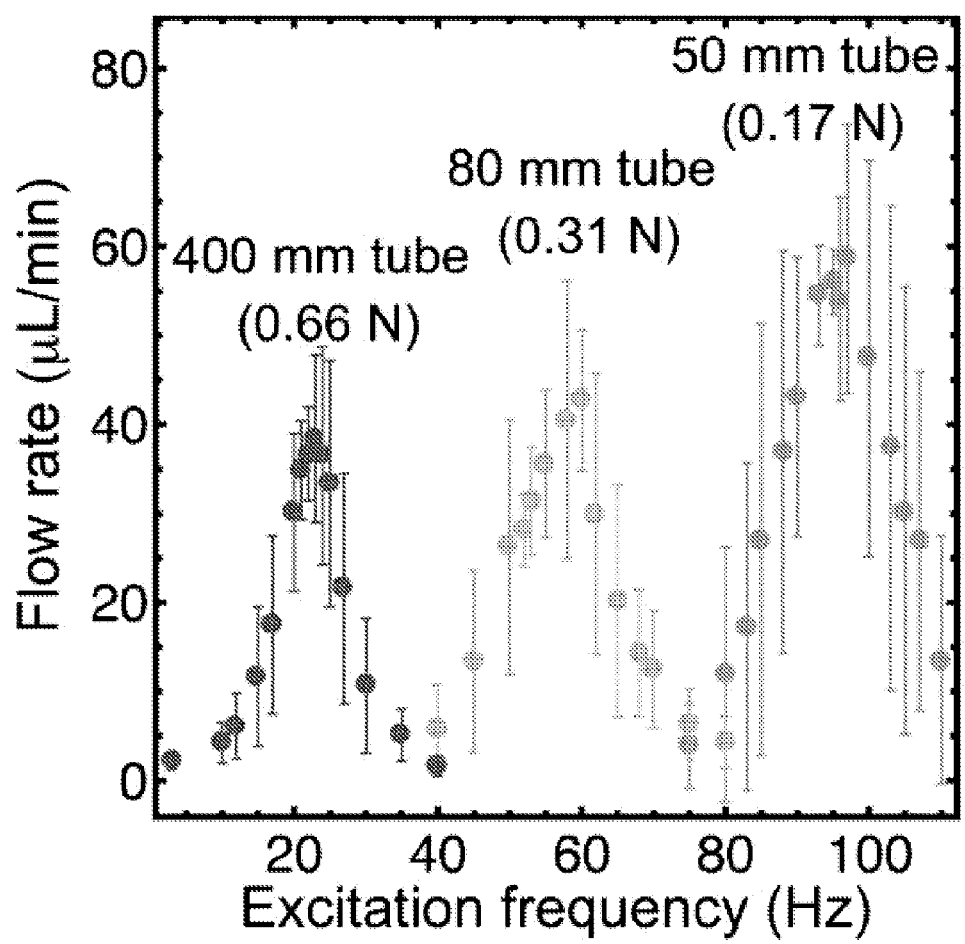
FIG. 6A illustrates generally an illustrative example of a flow rate elicited in a fluidic network as a function of excitation frequency, for various actuator tube lengths as can be obtained using the apparatus of FIG. 5.
Figure 6B:
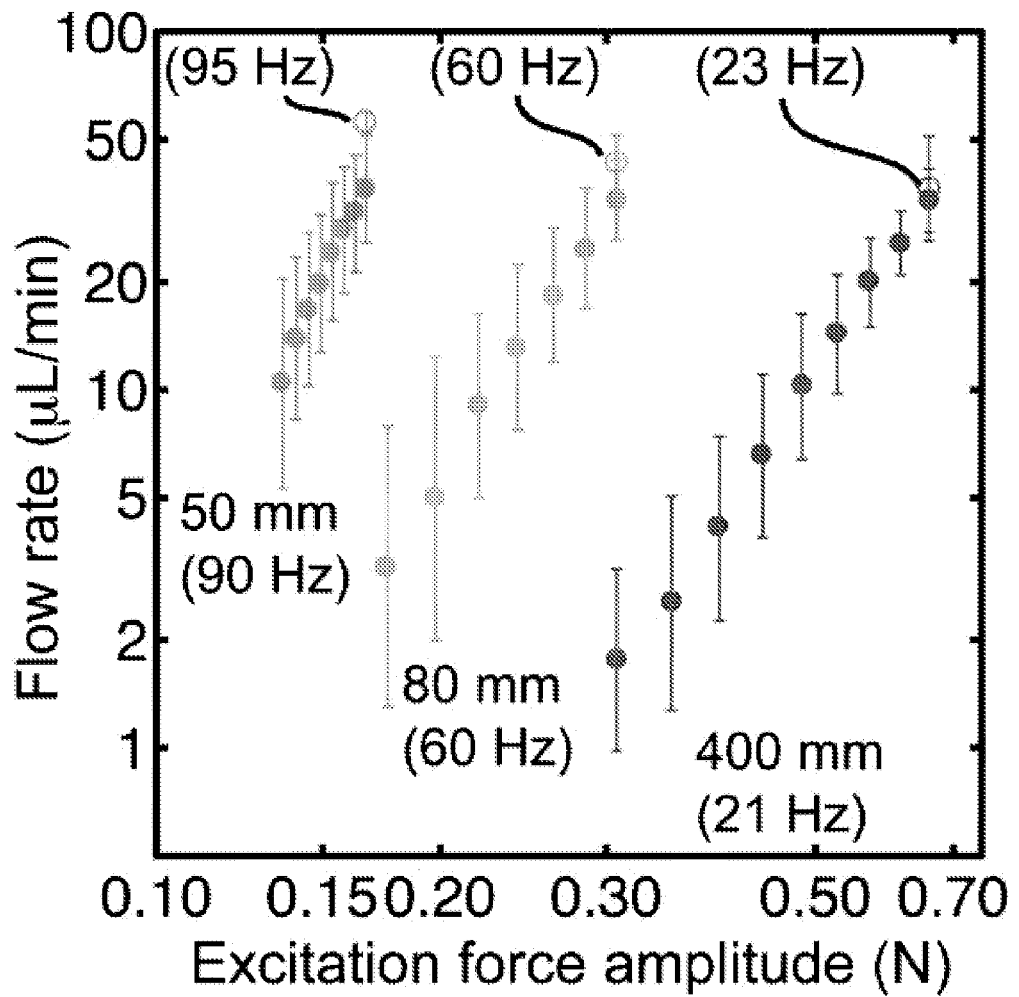
FIG. 6B illustrates generally an illustrative example of a flow rate elicited as a function of actuation force, for various actuator tube lengths as can be obtained using the apparatus of FIG. 5.
Figure 6C:
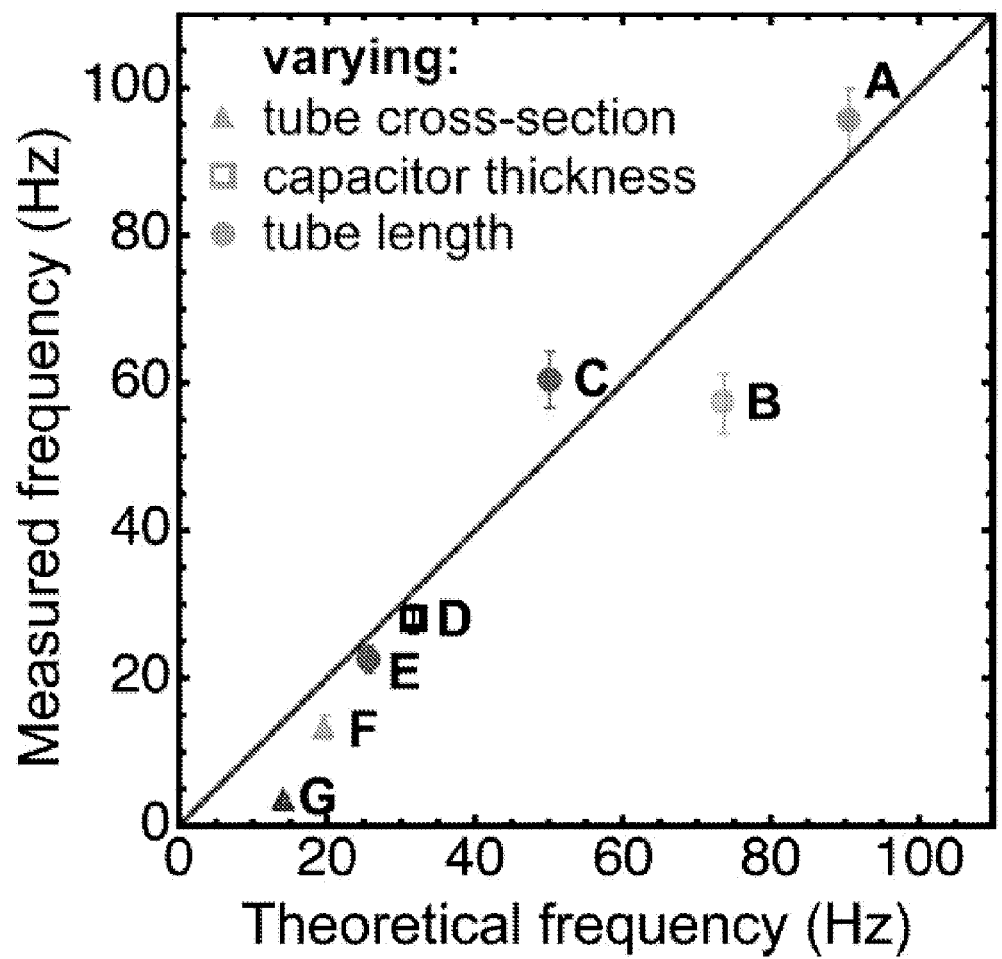
FIG. 6C illustrates generally an illustrative example of a relationship between a predicted theoretical frequency of enhanced flow versus a measured frequency that resulted in enhanced flow, for various configurations of the apparatus shown in the example of FIG. 5.

The capacitance above is generally within 1% of the exact solution for the annulus configuration shown in the illustrative example of FIG. 5 and used for obtaining the illustrative examples of FIGS. 6A through 6C.

FIG. 5 illustrates generally an illustrative example 500 of a frequency-selective configuration that can be used to evaluate various configurations of mechanical filter networks and coupled microfluidic devices, such as can be used to obtain the results shown in the illustrative examples of FIGS. 6A through 6C.

An electromagnetic voice-coil 520 can be used to apply harmonic pressures at various frequencies to one end of a tube 520; the other end of the tube 520 can be connected to a deformable capacitor that couples this input to the chip network 502. A length of the tube 510 can be used to control an amount of fluid inertia, and such inertia can govern a frequency response of a system including the tube 510. An oscillatory pressure input can be converted to steady-flow components within the chip network using a deformable diode feature embedded in the chip network 502. Such passive diodes can be operational over the frequency range of interest, and do not appreciably change the characteristic frequencies of the coupled networks in the frequency range of interest (e.g., 10s to 100s of Hertz).

In the illustrative example of FIG. 5, and as discussed in other examples herein such as FIGS. 1, 2, and 3A through 3C, the actuator 520 is connected to the flow being driven only through passive features, greatly simplifying system fabrication and assembly. Such a configuration can also provide better frequency-specificity and a greater range of available operating frequencies unlike other approaches including active valve structures, for example.

In the illustrative examples of FIGS. 5, 6A through 6C, 7, 8A and 8B, a 1.1 mm-thick Borofloat® (Schott) glass "channel" layer can be formed to include portions of passive fluidic circuit features, such as shown illustrative in FIG. 5. A glass "actuation" layer can be formed using a similar rigid material, such as sandwiching a poly(dimethylsiloxane) (PDMS) interlayer. Features in the glass layers can be formed using lithographic techniques and wet etching, for example. In various illustrative examples, the PDMS interlayer can include a pre-cured 254 micrometer (μm) film (e.g., Bisco Silicones HT-6240) or a pre-cured film with an additional 160 μm spin coated and cured layer, for example. Spin coated PDMS layers can be prepared from a commercial precursor kit (e.g., Dow Corning Sylgard 184), such as mixed with a 10:1 base to curing agent ratio. A PDMS film thickness of 160 μm can be achieved with two sequential coats spin coated at 750 revolutions-per-minute (RPM) on a silicon (Si) substrate. Immediately prior to spin coating, a few drops of a release agent (e.g., Jersey-Cote, LabScientific, Inc.) can be applied to the Si substrate and spun at 3500 RPM for 30 seconds. After spincoating, the PDMS films can be cured for 1 hour at 80° C. Film thicknesses can be measured by optical interferometry (e.g., using a Wyko NT1100, Veeco Instruments, Inc.).

In an illustrative example, microfluidic devices, such as having a configuration as shown in the example of the chip network 502 of FIG. 5, can be bonded as follows: the surfaces of the PDMS and glass channel layers can be plasma-treated using a hand-held corona treater (e.g., Electro-Technic Products BD20-AC) for about 10 seconds, pressed together, and baked in a 80° C. oven for several hours. Prior to bonding, the glass layers can be rinsed in acetone, isopropyl alcohol, methanol, and deionized water. Fluidic diodes can be defined by patterning photoresist (e.g., AZ 4210) in a weir region between the circuit channels and outlet channels; the photoresist can be subsequently dissolved with acetone, leaving an unbonded strip along the weir.

A linear voice-coil actuator 520 (e.g., NCM02-005-4JBA, with A1 housing, H2W Technologies, Valencia, Calif., USA) can be used to drive the input fluidic circuit (including actuator tube 510) that interfaces with the microfluidic device, shown schematically in the example of FIG. 5. For example, a piston attached to the voice-coil actuator 520 can drive a 254-μm-thick PDMS film 504 that caps a syringe tip connected to a length of tubing 510 leading to the capacitor input of the microfluidic device 502. The voice-coil actuator 520 can be driven by a linear amplifier assembly (e.g., LCAM7-9, H2W Technologies, Valencia, Calif., USA) using a sinusoidal voltage signal generated by LabVIEW code, via an analog output on a USB data acquisition device (e.g., USB-6351, National Instruments, Austin, Tex., USA). For single-tube measurements, the inlet tubing (e.g., Tygon S-54-HL, such as having inner/outer diameters of 1.27/2.29, 0.76/2.29, or 0.51/1.52 millimeters) can be cut to lengths of 50, 80, 150, or 400 mm and connected to the capacitor inlet of the circuit using a Nanoport (e.g., N-333, IDEX Health & Science, Oak Harbor, Wash., USA).

During device operation, a motion of the voice-coil actuator can be monitored with a high-speed CCD laser displacement sensor (e.g., LK-G32, Keyence Corportion, Itasca, Ill., USA). A dominant frequency and amplitude of the deflection signal can be determined, such as using LabVIEW code executing a fast-Fourier-transform (FFT) technique. A microfluidic device and the actuator network can be filled with a dye solution consisting of Erioglaucine disodium (acid blue 9) in water. Flow rate measurements can be performed by connecting an output tube to a circuit outlet, such as shown illustrative in FIG. 5. A LabVIEW application can be used to excite the voice-coil actuator 520 at frequencies ranging from about 1 Hz to about 180 Hz, in an illustrative example. A displacement of the fluid front can be monitored using a charge-coupled device (CCD) camera, and image analysis can be performed using a software-implemented technique, for example.

An average flow rate at each frequency can be calculated from the displacement of the fluid front, such as using information about actuation time and a cross-sectional area of the outlet tube. For flow composition measurements in two-branch circuits, such as shown illustratively in FIGS. 8A and 8B, one circuit channel can be filled with a solution of Tartrazine (acid yellow 23) in buffer (e.g., Fisher TE 10x) and the second channel can be filled with plain buffer solution. The solutions can be collected at a circuit outlet after each run and diluted to a known volume and a flow composition can be computed from absorbance measurements using a colorimeter (e.g., Vernier COL-BTA).

FIG. 6A illustrates generally an illustrative example of a flow rate elicited in a fluidic network as a function of excitation frequency, for various actuator tube lengths as can be obtained using the apparatus and techniques described in the illustrative example of FIG. 5.

An experimentally-obtained frequency response of the illustrative example of FIG. 5 is shown in the illustrative examples of FIGS. 6A and 6B for various types of actuator tubes. FIG. 6A illustrates generally that an output flow rate (e.g., rectified flow through a diode on-chip) generally exhibits band-pass behavior, selectively delivering flow at characteristic frequencies.

FIG. 6B illustrates generally an illustrative example of a flow rate elicited as a function of actuation force, for various actuator tube lengths as can be obtained using the apparatus and techniques of the illustrative example of FIG. 5. To quantify flow behavior as a function of input pressure, as shown in FIG. 6B, a fluidic circuit can be driven at frequencies near resonance for 50, 80, and 400 mm input tubes. A maximum average flow rate, corresponding to the resonant frequency, is plotted as well. A power-law dependence of flow rate on input force amplitude is generally in agreement with steady-flow predictions for diodes that are based on coupling between pressure magnitude, diode deformation and flow. Solid-fluidic coupling in these diodes need not be strongly influenced by dynamic flow behaviors, at least at the range of frequencies shown in the illustrative example of FIG. 6B. Scatter in the experimentally obtained results of FIG. 6B is likely due to variations in actuator alignment and the background pressures introduced to the network during assembly.

Motion of the film at the tube/chip interface is generally quite small. Though not directly quantified in FIG. 6B, an upper bound for the motion of this film can be obtained by equating a volume delivered per cycle in the chip network 502 to a volume associated with the film motion. This corresponds to an estimated film motion on the order of several micrometers, which is generally much smaller than the motion of the voice coil. This can be a consequence of stray mechanical capacitance in the system (e.g., of the tube itself or annulus around the input piston). Without being bound by theory, it is believed that such stray capacitance can absorb much of the injected volume and prevent its delivery to the tube/chip interface. Motion of the fluidic diode film in the chip network can be inferred to be even smaller, and while not being bound by theory, this can suggest that viscous losses in the diode can be a mechanism controlling bandwidth.

The illustrative example of FIGS. 6A and 6B show generally that microfluidic devices having at least three functional domains can be realized, for example, using channel frequencies of about 20, about 60, and about 100 Hz using features similar to those illustrated generally in FIGS. 6A and 6B, and discussed in relation to FIG. 5. The experimentally-observed bandwidths are sufficiently narrow to make branches with these frequencies independently addressable and the flow rates illustrated in examples herein within a range suitable for chemical analysis or assay, such as for use in a bioanalytical micro-analysis system. Actuation parameters in the ranges shown in the illustrative examples herein, such as for the mechanical actuator, can be obtained using generally-available actuator components.

An upper limit of the usable frequency range and lower limit on bandwidth can be concerns for applications involving a large number of functional domains. Structures similar to those described in the illustrative examples herein may be used to construct branches with higher natural frequencies, such as exploiting stiffer materials (e.g., using glassy polymers such as polystyrene, poly(methyl methacrylate) or polycarbonate).

FIG. 6C illustrates generally an illustrative example of a relationship between a predicted theoretical frequency of enhanced flow versus a measured frequency that resulted in enhanced flow, for various configurations of the apparatus shown in the example of FIG. 5. A peak flow rate can be a function of the voice-coil (input actuator) force amplitude, as shown in FIG. 6B. FIG. 6C and TABLE 1 illustrate generally frequencies corresponding to peak flow rates for various mechanical configurations, as well as a comparison with a theoretical model, corresponding to the illustrative examples of FIGS. 4 (e.g., network model) and 5 (e.g., apparatus and techniques).

A frequency response can be broadly modulated (with peaks ranging from about 3 Hz to about 95 Hz for this example) such as by varying the actuator tube 510 length or cross-sectional area as shown in FIG. 6C. Points A, B, C, and E correspond to tubes with the same cross-sectional areas and different lengths, while points F and G correspond to tubes with the same length as E but different cross-sectional areas. Increasing a stiffness of the on-chip capacitor also produces an upward shift in peak frequency. For example, point D can be compared with point E, where both cases have 400 mm long tubes but different capacitor film thicknesses of 414 µm and 254 µm.

The illustrative example of the apparatus of FIG. 5 can produce two characteristic frequencies that can be associated with the voice coil and chip capacitor respectively. TABLE 1, below illustrates such experimentally-determined and modeled characteristic frequencies, with a frequency associated with the chip capacitor plotted against peak flow frequencies in FIG. 6C. TABLE 2, below, illustrates the mechanical configuration used to obtain the modeled and experimental results of the illustrative examples of TABLE 1 and FIG. 6C.

Peak flow generally occurs when the apparatus is tuned (e.g., actuator delivers energy) at the characteristic frequency associated with the chip capacitor. By contrast, flow rates are negligible when the apparatus is tuned to a natural frequency associated with the actuator (with the exception of the case where both frequencies are comparable).

TABLE 1

Frequency at which peak flow rate occurs ($\omega_f$), flow rate bandwidth ($\Delta\omega_f$), frequency at which peak actuator displacement occurs ($\omega_a$), and theoretical peak frequency for actuator displacement ($\omega_a^{th}$) for the illustrative examples shown in FIG. 6C.

| POINT | $\omega_f$ (Hz) | $\Delta\omega_f$ (Hz) | $\omega_a$ (Hz) | $\omega_a^{th}$ (Hz) |
|---|---|---|---|---|
| A | 95 ± 5 | 20 | 95 ± 3 | 114 |
| B | 57 ± 4 | 17 | 103 ± 3 | 104 |
| C | 60 ± 4 | 26 | 118 ± 34 | 101 |
| D | 28 ± 2 | 10 | 124 ± 11 | 98 |
| E | 23 ± 2 | 13 | 110 ± 14 | 98 |
| F | 13 ± 2 | 10 | 143 ± 6 | 100 |
| G | 3.5 ± 0.5 | 4 | n/a* | 100 |

*Response over-damped

Agreement exists between the predicted (e.g., theoretical) maximum frequency and the measured frequency of peak flow even though there are no fitting constants in the model. Nominal properties can be used for all variables in the mechanics solutions. A single exception to the use of nominal values can be that resistance in the tube is neglected for the predictions shown in TABLE 1 and FIG. 6C. Tubular structures shown in the illustrative example of FIG. 5 can have negligible flow resistance, assuming steady flow profiles. By contrast, pulsatile flow can lead to velocity profiles that are quite different than those underlying the above estimates, and such pulsatile flow can lead to frequency-dependent resistance that can be much larger. This was modeled and experimentally measured in point G, as shown in TABLE 1, but produced an over-damped response in the model that was not observed in experiment. Predictions for the natural frequency associated with the actuator show greater, though still reasonable, discrepancies. Such discrepancies can be due to imperfect alignment of the actuator assembly altering a stiffness of the assembly.

TABLE 2

Illustrative examples of configurations that can be used to obtain the experimental results shown in FIG. 6C.

| POINT | TUBE LENGTH (mm) | INNER/OUTER DIAMETER (mm/mm) | ON-CHIP CAPACITOR THICKNESS (µm) |
|---|---|---|---|
| A | 50 | 1.27/2.29 | 254 |
| B | 80 | 1.27/2.29 | 254 |
| C | 150 | 1.27/2.29 | 254 |
| D | 400 | 1.27/2.29 | 414 |
| E | 400 | 1.27/2.29 | 254 |
| F | 400 | 0.76/2.29 | 254 |
| G | 400 | 0.51/1.52 | 254 |

In the illustrative examples of TABLE 2 and as shown in FIG. 6C, the tube elastic modulus is 16.3+/−0.4 MegaPascals (MPa), an on-chip channel depth is 100 µm, and a resistor length is 46 mm.

Figure 7:
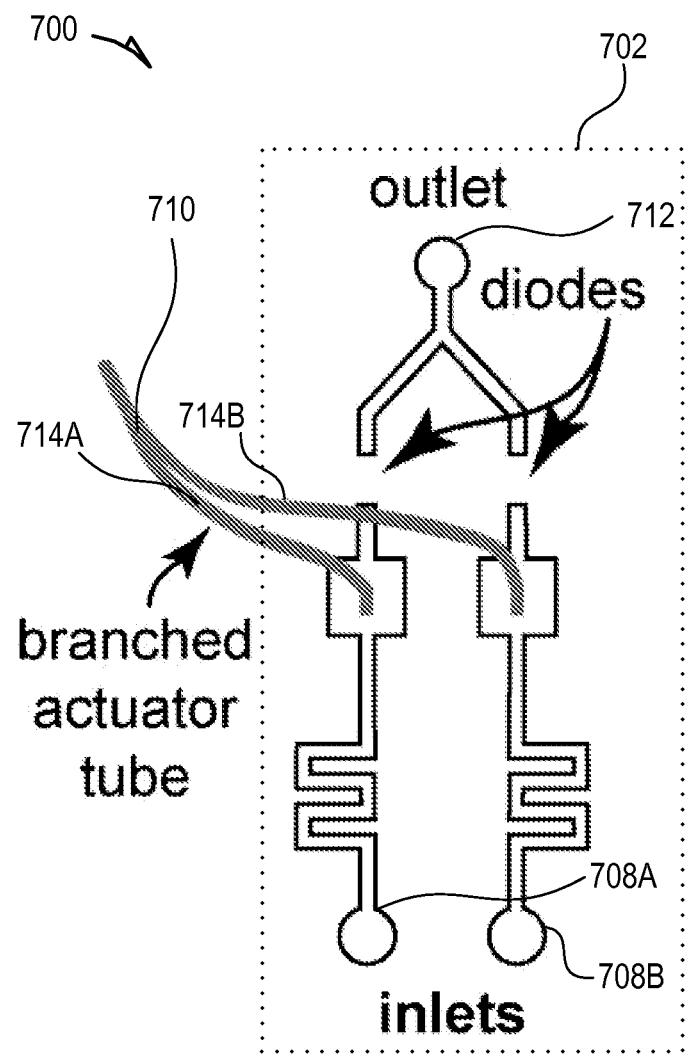
FIG. 7 illustrates generally an illustrative example of a frequency-selective fluidic network coupled to a fluidic device, such as can be used to obtain the results shown in the illustrative examples of FIGS. 8A and 8B.
Figure 8A:
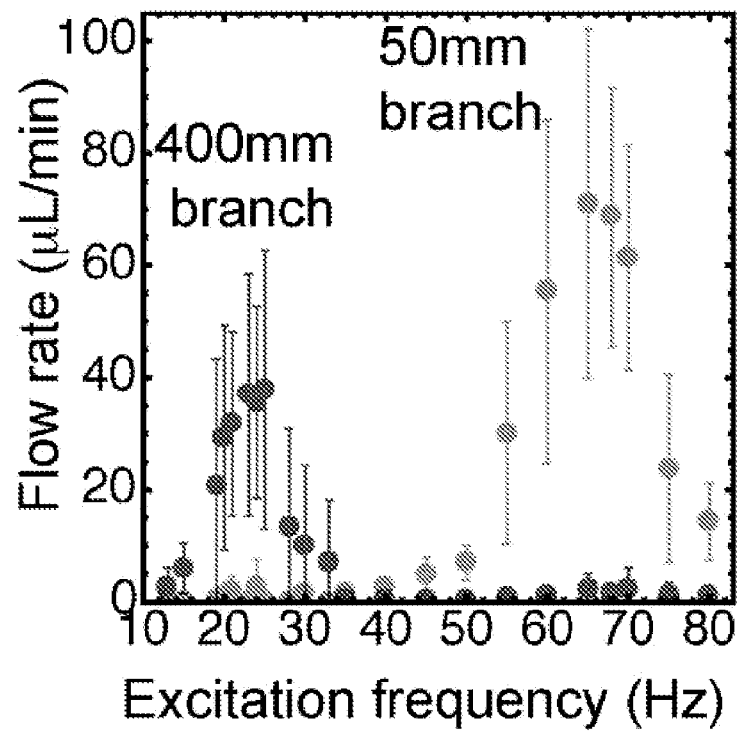
FIGS. 8A and 8B illustrate generally illustrative examples of relationships including flow rate (FIG. 8A) or flow fraction (FIG. 8B) with respect to excitation frequency for the configuration shown in the example of FIG. 7.
Figure 8B:
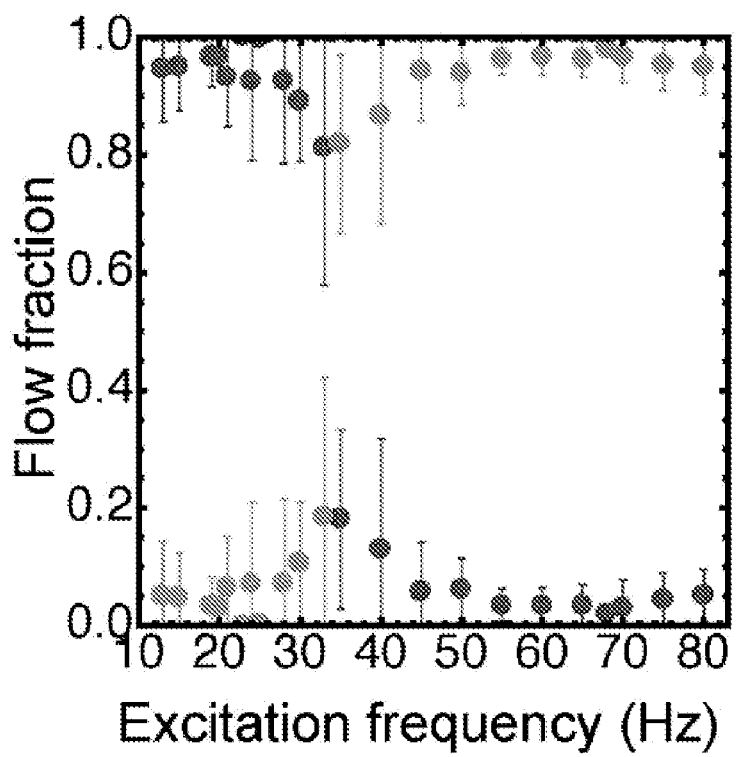

FIG. 7 illustrates generally an illustrative example of a frequency-selective fluidic network coupled to a fluidic device, such as can be used to obtain the results shown in the illustrative examples of FIGS. 8A and 8B. A branched actuator tube 710 can be coupled to a microfluidic device 702, such as including respective inlets 708A and 708B, and a respective outlet 712. For branched-tube measurements, such as shown in the illustrative example of FIG. 7, a "Y"-shaped barb connector can be used to create branches 714A and 714B, and such branches can have lengths of 400 mm and 50 mm, respectively, connected to a circuit formed in the microfluidic device 702 having two identical channels. In this manner, a branched input tube 710 can be used to contemporaneously deliver a periodic pressure input (e.g., a displacement) to two deformable mechanical input features connected to two separate but identical branches in the chip 702 as shown illustratively in FIG. 7.

FIGS. 8A and 8B illustrate generally illustrative examples of relationships including flow rate (FIG. 8A) or flow fraction (FIG. 8B) with respect to excitation frequency for the configuration shown in the example of FIG. 7. An experimentally-obtained average flow rate and flow composition versus excitation frequency are illustrated generally in the illustrative examples of FIGS. 8A and 8B. Such examples illustrate generally that precise flow switching behavior can be obtained for each respective branch, with only a relatively narrow frequency range (about 30-40 Hz) in which flow output is comparable for both branches contemporaneously. Such results illustrate generally that flow can be enhanced in one channel of the microfluidic device 702 and suppressed in another channel, such as using a first range of frequencies (e.g., such as below about 30 Hz), and flow can be enhanced in the opposite channel and suppressed in the first channel using a second range of frequencies (e.g., such as above about 40 Hz). Flow can be enhanced in both channels contemporaneously using actuator energy in the range from about 30 to about 40 Hz. In this manner, metering can be achieved.

If the frequency ranges wherein flow is enhanced are non-overlapping for particular channels, a compound excitation signal involving two frequencies and two amplitudes could be used to contemporaneously to enhance flow in both channels of the microfluidic circuit, such as by exciting both branches 714A and 714B in the case of two input branches. Such metering and control as discussed in the examples above can be extended to systems having more than two branches in the fluidic filter network or two channels in the microfluidic device coupled to the fluidic filter network, such as to provide flow control for a broad range of configurations of microfluidic devices in an addressable manner using fluidically-isolated fluidic filter networks, such as a fluidic filter network comprising a branched tube configuration, or an integrated fluidic filter network formed using rigid and compliant materials similar to the microfluidic device, but fluidically isolated from the microfluidic device.

Figure 9:
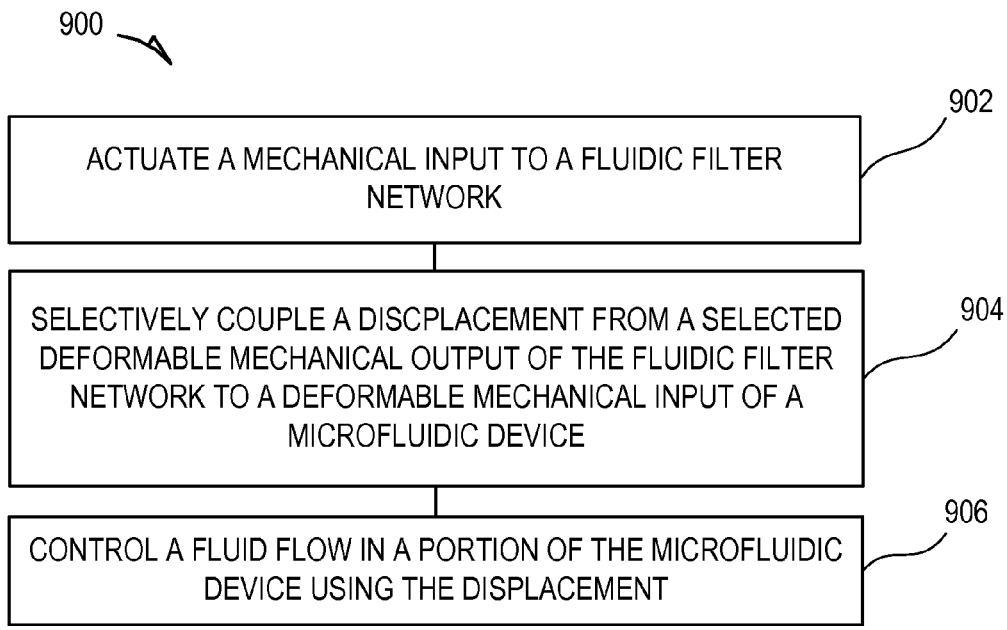
FIG. 9 illustrates generally a technique, such as a method, that can include selectively controlling flow in a microfluidic device.

FIG. 9 illustrates generally a technique, such as a method, that can include selectively controlling flow in a microfluidic device. At 902, a mechanical input to a fluidic filter network (such as a tubular filter network or an integrated filter network) can be actuated. The actuation can be performed by an electrical-to-mechanical actuator, such as a voice-coil. At 904, a displacement from a selected deformable mechanical output of a fluidic filter network can be selectively coupled to a mechanical input of a microfluidic device. At 906, a fluid flow in a portion of the microfluidic device can be controlled using the coupled displacement. For example, the fluidic filter network can couple the displacement to a selected deformable mechanical output when the displacement provided by the actuator includes energy in a specified range of frequencies, such as described in examples elsewhere herein. In this manner, frequency-based flow control can be achieved.

VARIOUS NOTES & EXAMPLES

Each of the non-limiting examples described in this document can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method, comprising:
    actuating a mechanical input to a closed fluidic filter network, the fluidic filter network comprising respective branches fluidically coupling the mechanical input to respective deformable mechanical outputs of the fluidic filter network, the respective deformable mechanical outputs located on an exterior surface of the fluidic filter network;
    selectively transmitting a mechanical displacement from a selected deformable mechanical output of the fluidic filter network to a deformable mechanical input of a microfluidic device, the microfluidic device positioned on the exterior surface of the fluidic filter network;
    controlling a fluid flow in a portion of the microfluidic device using the transmitted displacement;
    wherein the selected deformable mechanical output is selected at least in part by actuating the mechanical input to produce a displacement having energy in a specified range of frequencies; and
    wherein the fluidic filter network is fluidically isolated from the microfluidic device.

2. The method of claim 1, wherein the actuating the mechanical input includes using an electrical-to-mechanical actuator coupled to a processor circuit, the processor circuit configured to control the electrical-to-mechanical actuator using instructions stored on a processor-readable medium.

3. The method of claim 1, wherein the selectively transmitting the mechanical displacement includes placing the microfluidic device on or within a mechanical receptacle, the mechanical receptacle to align respective deformable mechanical outputs of the of the fluidic filter network with corresponding mechanical inputs of the microfluidic device.

4. The method of claim 1, wherein controlling the fluid flow in the portion of the microfluidic device includes enhancing flow in a first fluid-filled branch of the fluidic filter network using a displacement provided by the actuating, the displacement having energy in a first range of frequencies.

5. The method of claim 4, wherein controlling the fluid flow in the portion of the microfluidic device includes enhancing flow in a second fluid-filled branch of the fluidic filter network using a displacement provided by the actuating, the displacement having energy in a different second range of frequencies.

6. A system, comprising:
    a closed fluidic filter network including:
        a first fluid-filled branch fluidically coupling a mechanical input to a first deformable mechanical output; and
        a second fluid-filled branch fluidically coupling the mechanical input to a second deformable mechanical output;
        wherein the first fluid-filled branch is sized and shaped to transmit a mechanical displacement from the mechanical input to the first deformable mechanical output when the mechanical displacement includes energy in a first range of frequencies;

wherein the second fluid-filled branch is sized and shaped to couple a mechanical displacement from the mechanical input to the second deformable mechanical output when the mechanical displacement includes energy in a different second range of frequencies;

wherein the first deformable mechanical output and the second deformable mechanical output are located on an exterior surface of the fluidic filter network; and a microfluidic device positioned on the exterior surface of the fluidic filter network, the microfluidic device comprising a fluidic channel including a deformable mechanical input coupled to a respective deformable mechanical output amongst the first and second deformable mechanical outputs of the fluidic filter network;

wherein a flow in the fluidic channel of the microfluidic device is controlled using a displacement transmitted from the respective deformable mechanical output of the fluidic filter network in response to a displacement provided at the mechanical input of the fluidic filter network, the microfluidic device fluidically isolated from the fluidic filter network.

7. The system of claim 6, comprising an electrical-to-mechanical actuator mechanically coupled to the mechanical input to mechanically displace the mechanical input using energy having a specified range of frequencies.

8. The system of claim 7, wherein the electrical-to-mechanical actuator comprises a voice-coil actuator.

9. The system of claim 8, comprising a processor circuit coupled to the electrical-to-mechanical actuator to address a specified one or more of the first deformable mechanical output or the second deformable mechanical output by controlling the actuator to mechanically displace the mechanical input using energy having the specified range of frequencies.

10. The system of claim 6, wherein the microfluidic device includes a fluidic diode.

11. The system of claim 10, wherein the microfluidic device comprises respective deformable mechanical inputs coupled to respective deformable mechanical outputs of the fluidic filter network; and wherein the respective deformable mechanical inputs are selectively addressable for transmitting a displacement selectively to a selected one or more deformable mechanical inputs using the fluidic filter network.

12. The system of claim 10, wherein the microfluidic device comprises at least one compliant layer and at least one rigid layer.

13. The system of claim 12, wherein the rigid layer includes glass, and wherein the compliant layer includes PDMS.

14. The system of claim 10, a mechanical receptacle configured to mechanically couple the microfluidic device to the fluidic filter network when the microfluidic device is inserted in the mechanical receptacle.

15. The system of claim 6, wherein the first and second branches have different lengths, and wherein the first and second ranges of frequencies are established at least in part by the respective different lengths.

16. The system of claim 6, wherein the first and second fluid-filled branches comprise channels formed in a rigid material; and wherein the first and second deformable mechanical outputs comprise respective deformable membranes.

17. The system of claim 6, wherein the first and second deformable mechanical outputs and the mechanical input comprise respective deformable membranes.

18. A system, comprising:
a closed fluidic filter network respective fluid-filled branches fluidically coupling a mechanical input to respective deformable mechanical outputs, the respective deformable mechanical outputs located on an exterior surface of the fluidic filter network;

an electrical-to-mechanical actuator mechanically coupled to the mechanical input to mechanically displace the mechanical input using energy having a specified range of frequencies;

a removable microfluidic device including respective deformable mechanical inputs coupled to respective deformable mechanical outputs of the fluidic filter network;

wherein the respective deformable mechanical inputs are selectively addressable for transmitting a displacement selectively to a selected one or more deformable mechanical inputs using the fluidic filter network;

wherein a flow in a specified portion of the microfluidic device is controlled using a displacement transmitted from a selected deformable mechanical output of the fluidic filter network to a respective deformable mechanical input of the microfluidic device in response to a displacement coupled to the mechanical input of the fluidic filter network having energy in a specified range of frequencies; and wherein the fluidic filter network is fluidically isolated from the microfluidic device at least in part using the respective deformable mechanical outputs.

\* \* \* \* \*

UNITED STATES PATENT AND TRADEMARK OFFICE
CERTIFICATE OF CORRECTION

PATENT NO. : 9,987,576 B2  
APPLICATION NO. : 14/650743  
DATED : June 5, 2018  
INVENTOR(S) : Landers et al.

Page 1 of 1

It is certified that error appears in the above-identified patent and that said Letters Patent is hereby corrected as shown below:

On the Title Page

Item [72], in Column 1, Line 2, delete "Goleta," and insert --Santa Barbara-- therefor Item [72], in Column 1, Line 3, after "(US)", insert --; Rachel Collino, Goleta, CA (US)--

Item [*], in "Notice", in Column 1, Line 3, delete "days. days." and insert --days.-- therefor Signed and Sealed this  
Twentieth Day of August, 2019

Andrei Iancu  
*Director of the United States Patent and Trademark Office*